July 6, 1926.
H. FRIESS
1,591,118
POSITIVE FILM BAND STRIP AND METHOD OF MANUFACTURING IT
Filed July 5, 1921
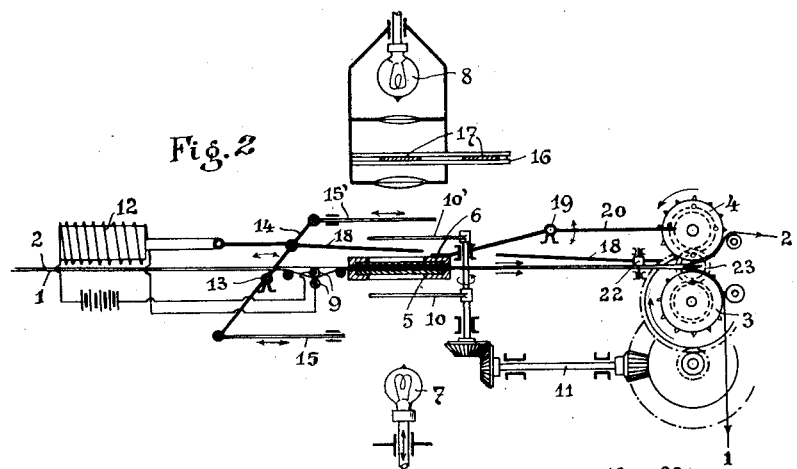
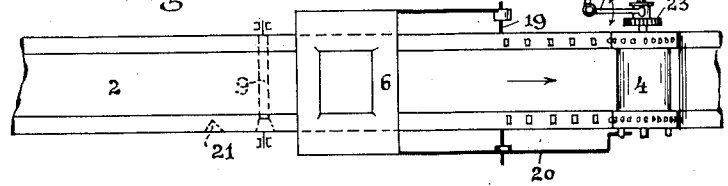
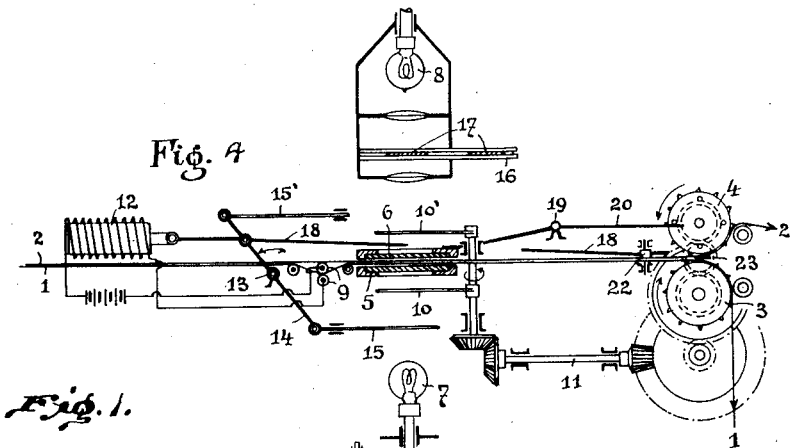
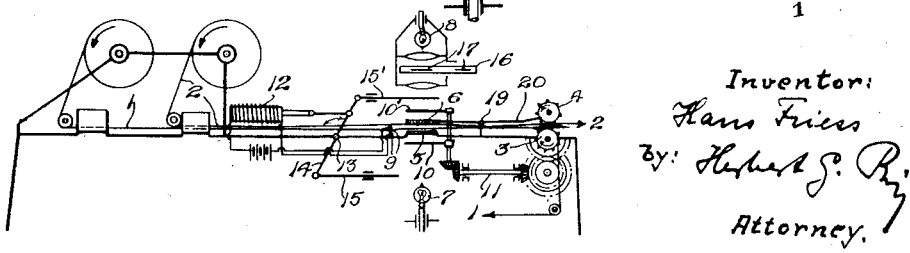
Inventor:
Hans Friess
By: Herbert G. Ry,
Attorney.

Patented July 6, 1926.

1,591,118

UNITED STATES PATENT OFFICE.

HANS FRIESS, OF NUREMBERG, GERMANY.

POSITIVE FILM-BAND STRIP AND METHOD OF MANUFACTURING IT.

Application filed July 5, 1921, Serial No. 482,547, and in Germany February 10, 1919.

(GRANTED UNDER THE PROVISIONS OF THE ACT OF MARCH 3, 1921, 41 STAT. L., 1313.)

Applications for this invention have been filed in Germany on February 10, 1919, (Patent No. 333,613); in France on March 31, 1921, (Patent No. 533,158); in Austria on March 22, 1921, (Patent No. 87,856); in Hungary on March 29, 1921; and in Italy on March 28, 1921.

My invention relates to a positive film band strip which is ready for the screen, and to a method of manufacturing this film band strip. This latter is made from a negative film band strip composed of the consecutive scenes. Positive film band strips ready for the screen have been manufactured hitherto by composing the individual scenes and inserting the titles and inscriptions at the proper places, the whole representing then the piece to be shown on the screen. In manufacturing the positive film band strip from the negative bands these latter were so selected that as far as possible equally exposed bands agreeing also with respect to their depth of tone were copied in pieces onto the positive band, and the composition according to the succession of the scenes was effected after the negative band had been developed.

It has, however, also been tried already to unite with each other negative film band pieces, without paying attention to the proper succession of the scenes, which had been exposed under like illumination conditions, the thus composed band being then copied by means of a mechanical apparatus in jerk-wise motion, and the thus obtained positive band being then cut and re-composed according to the succession of the scenes, with the title and inscriptions inserted. The advantage of that procedure resided in the feature that only pictures of equal tone were treated at a time whereby it was rendered possible to effect the treatment mechanically by a suitable apparatus. Only then the thus made positive film band strip was cut and re-composed together with the titles etc., as already stated. The many places of junction are, of course, a severe disadvantage and, besides, the procedure requires by far too much time.

The present invention is distinguished from the before-mentioned known procedures by the essential feature that the positive film band strip is made from the beginning in one piece, including the titles and the inscriptions. The procedure is very much simpler than those other ones as there are no composing and gluing operations which is particularly important for the quality of the film band strip obtained.

The procedure is as follows: The negative film bands showing the consecutive scenes of the piece and having been developed in the usual manner are united with each other to form a continuous strip without any consideration to the lighter or darker tone of the various scenes, all these scenes following each other in their proper succession. The thus obtained strip is now introduced into any suitable known copying apparatus together with the positive film band strip and the two bands are moved forwards together in jerk-wise motion, or step by step respectively, the consecutive scenes being copied during the intervals by means of any suited source of light. This latter is shut off while the bands are moved another step, the periods of transportation being, thus, the dark ones.

Now, while the pictures are thus being copied onto the positive band also the titles and other inscriptions are copied onto this latter, that is to say, the negative film band is not moved during that time until the titles etc. have been copied. Only then both film bands are again moved together until another title etc. must be inserted. The means for moving the bands in this way singly or together, as the case may be according to the scenes of the pieces, may be of any suitable description.

After the copying operation the bands are separated, that is to say, the negative band is wound upon a bobbin, whereas the positive one is passed through the several baths and other devices by which it is further developed etc. until it is ready.

The product of the improved method is, therefore, a positive film band strip which is ready for the screen, as the titles etc. have been copied thereonto already while the pictures have been copied from the negative band onto the positive one, there being no places of junction, except at the ends where two such strips (each having a length of about 120 meters) must be united with each other.

In order to make my invention more clear, I refer to the accompanying drawing, in which Fig. 1 is a diagrammatic illustration of the procedure, in combination with the means employed; Figs. 2, 3, and 4 show on an enlarged scale the chief working parts of the copying device illustrated in the right-hand part of Fig. 1.

The negative film band 1 is composed in correspondence with the consecutive scenes of the performance, without any regard to the single scenes having been differently exposed to light and differently developed and is introduced together with the positive film band 2 which has not been exposed to light into the copying device as shown in general in Fig. 1 and in particular in Figs. 2 to 4.

Feeding the two film strips is effected intermittently, according to the individual pictures, by the mediation of the rolls 3 and 4 in a known manner by means of a Maltese-cross drive or de Bric grippers.

Positively transmitting the motion from the roller 4 which is the driving roller to the roller 3 is effected by an axially shiftable cog-wheel 23.

The two film bands 1 and 2 coming from the spools pass through the copying windows 5 and 6 which, preferably, are pressed one against the other by a spring and are slackened during the feeding by means of the driving drum 4 and by the mediation of a double-armed lever 20 supported in the bearing 19 and engaging the upper half 6 of the copying window.

The change of the pictures in the exposing window is covered up in a known manner by two covering wings 10, 10', which are actuated from the main drive by the mediation of the gearing 11.

Copying the pictures from below is effected by the source of light 7, while another source of light 8 arranged above said source of light 7 serves for copying the titles and inscriptions by projecting these at the proper places between the pictures. The title negatives 17 are supported in a frame 16 arranged in the upper lamp casing.

While the pictures are copied from below by means of the source of light 7, the upper source of light 8 is covered up by a special slide 15' (Fig. 2), whereas the lower source of light 7 is cleared by the slide 15. Both slides are positively coupled with each other hinged to a double-armed lever 14 supported upon an axle 13.

The lever 14 is connected with the armature of the relay 12 which, in its turn, is connected with contact rollers 9 through which the negative film passes before entering the copying window 5, 6.

If copying the pictures shall be interrupted for the purpose of inserting a title or an inscription, a mark 21 (Fig. 3) worked into the negative film already, when preparing it, becomes active and allows of the contact rollers 9 closing the circuit on said mark, or marked place, passing through between them, whereby the relay armature is attracted and the swing-lever 14 is reversed.

Now the lower source of light 7 is covered up by the slide 15, whereas the upper source of light 8 is cleared by the slide 15' (Fig. 4).

Simultaneously with reversing the two covering-up slides the cog-wheel 23, by the mediation of which the film band roller 3 is driven, is uncoupled by the bell-crank lever 22 which also is coupled with the swing lever 14, or with the relay-armature 12 respectively, by the rods 18.

From this results that when reversing the covering-up slides 15, 15' the negative film band 1 is brought to a stand-still, so that only the positive film band 2 is intermittently fed in the steps of the pictures, the titles and inscriptions being at the same time copied from above by the source of light 8.

When the titles to be shown during a certain length of time have been copied, the relay-current is broken by means of a cut-out (not shown), whereby the reversal of the parts mentioned of their initial position (Fig. 2) is initiated. From this moment, the two film bands 1 and 2 are simultaneously fed, and copying the pictures from below is continued, whereas the title copying device is covered up.

Pressing the upper picture window half 6 against the lower picture window half 5 and pressing together the two film strips during the copying operation ensures sharp picture copies.

Immediately after the copying work has been finished, the negative film 1 is led to a drum for being spooled up, whereas the positive film 2 continues its motion alone and is introduced into the developing device.

I claim:

1. The method of manufacturing positive film band strip consisting in locating a negative film band showing the consecutive scenes on the one side and a negative of the titles to be inserted between said scenes on the other side of a positive film band strip, copying the pictures of the negative film band strip into said positive film band by moving them together through a copying apparatus, stopping the negative film band when the titles are to be printed on the positive film band and copying said titles at their places between the respective pictures without removing said negative film.

2. The method of manufacturing positive film band strip consisting in locating a negative film band showing the consecutive scenes on the one side and a negative of the titles to be inserted between said scenes on the other side of a positive film band strip, copying the pictures of the negative film band strip into said positive film band by moving them together through a copying apparatus and clearing a source of light arranged on the one side of the positive film band, stopping the negative film band when the titles are to be printed on the positive film band and copying said titles at their places between the respective pictures without removing said negative film, by a source of light arranged on the other side of the positive film band.

3. The method of manufacturing positive film band strip consisting in locating a negative film band showing the consecutive scenes on the one side and a negative of the titles to be inserted between said scenes on the other side of a positive film band strip, copying the pictures of the negative film band strip into said positive film band by moving them together through a copying apparatus, stopping the negative film band when the titles are to be printed on the positive film band, then moving only the positive film band strip and copying said titles at their places between the respective pictures without removing said negative film.

4. The method of manufacturing positive film band strip consisting in uniting with each other the negative film bands showing the consecutive scenes, without consideration to the differences in the tones of the pictures, locating said negative film band strip on the one side and a negative of the titles to be inserted between said scenes on the other side of a positive film band strip, copying the pictures of the negative film band strip into said positive film band by moving them together through a copying apparatus, stopping the negative film band when the titles are to be printed on the positive film band and copying said titles at their places between the respective pictures without removing said negative film.

5. The method of manufacturing positive film band strip consisting in locating a negative film band showing the consecutive scenes on the one side and a negative of the titles to be inserted between said scenes on the other side of a positive film band strip, copying the pictures of the negative film band strip into said positive film band by moving them together through a copying apparatus, stopping the negative film band when the titles are to be printed on the positive film band, then moving only the positive film band strip and copying said titles at their places between the respective pictures without removing said negative film, moving then again both bands together, and continuing this procedure until all pictures and titles, etc., have been copied onto said positive film band.

In testimony whereof I affix my signature.

HANS FRIESS.